April 11, 1944.  J. B. PARSONS  2,346,387
HYDRAULIC REGULATOR SYSTEM
Original Filed Jan. 12, 1942  2 Sheets-Sheet 1

John B. Parsons
INVENTOR

BY Malcolm W. Fraser
ATTORNEY

April 11, 1944.　　　J. B. PARSONS　　　2,346,387
HYDRAULIC REGULATOR SYSTEM
Original Filed Jan. 12, 1942　　2 Sheets-Sheet 2

John B. Parsons
INVENTOR

Patented Apr. 11, 1944

2,346,387

UNITED STATES PATENT OFFICE 2,346,387

HYDRAULIC REGULATOR SYSTEM

John B. Parsons, Toledo, Ohio

Continuation of application Serial No. 426,438, January 12, 1942. This application May 6, 1943, Serial No. 485,871

10 Claims. (Cl. 268—125)

This invention relates to fluid pressure regulator systems particularly adapted for the actuation of vehicle windows although it may be used for other purposes such, for example, as the actuation of vehicle seats or other members which are mounted for movement in opposite directions between two limits of travel or adjustment.

An object is to produce a simple and efficient regulator of the above character by which the member is actuated in one direction by fluid pressure means and in the opposite direction by a spring, the spring serving in addition, to absorb or compensate for the expansion of the pressure fluid due, for example, to temperature conditions when the member is in the limit of movement actuated by the pressure fluid means.

Another object is to produce a regulator assembly particularly adapted for the operation of vehicle windows which includes pressure fluid means connected and arranged to actuate the regulator in one direction and spring means to actuate the regulator in the opposite direction, these devices being so interconnected that the spring absorbs the expansion of the pressure fluid when the pressure fluid means is in the extreme position which it assumes when the window is in its closed position.

A further object is to produce a regulator of the above character having pressure fluid means for effecting movement of the member in one direction, a coil spring for assisting in the movement of the member in the opposite direction, and means which interconnects the pressure fluid means and the spring to enable the latter to absorb the expansion of the pressure fluid when the member is in one extreme position of adjustment, the last means also providing a stop for limiting the movement of the member in the opposite direction of movement.

Figure 1:
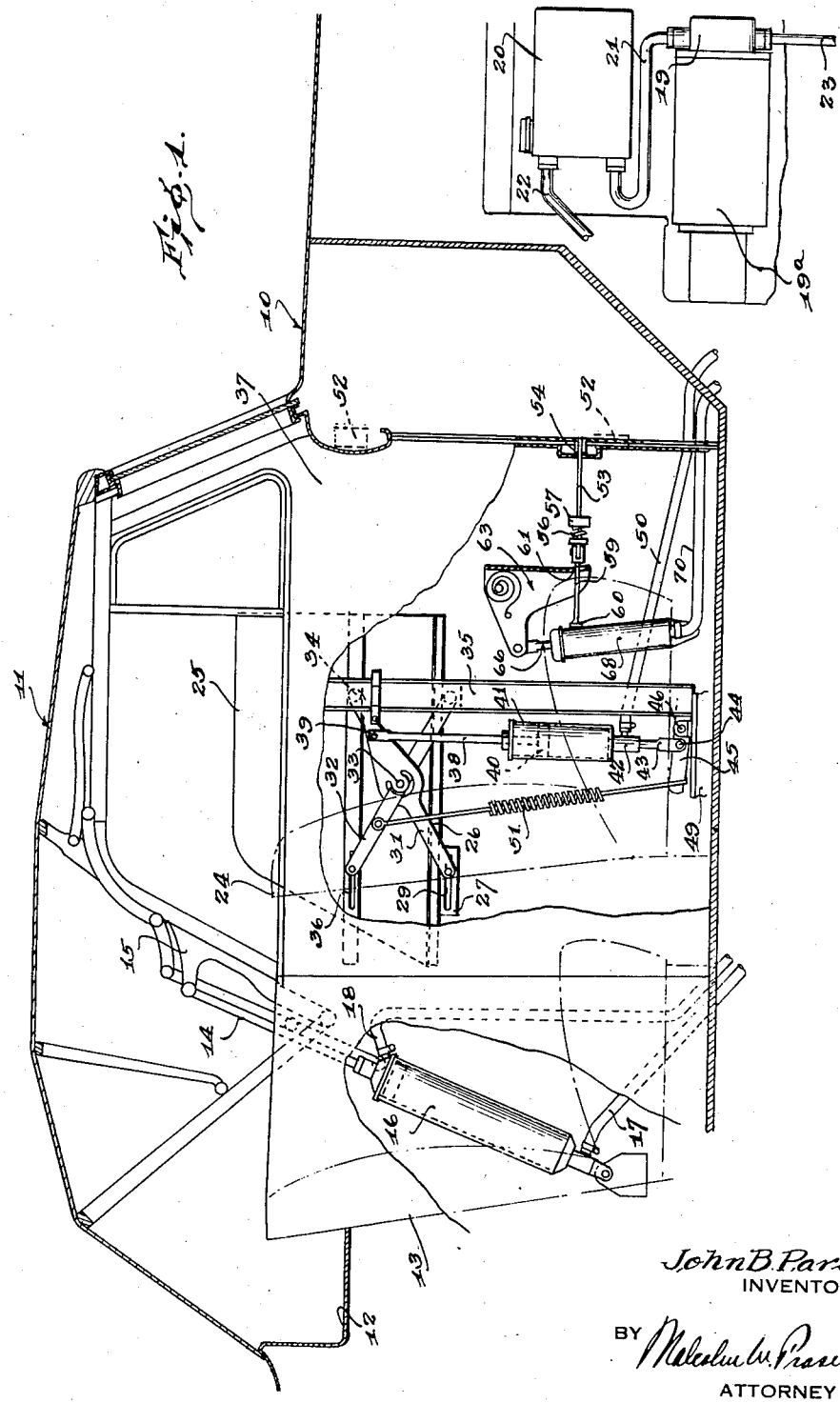
Figures 2, 3:
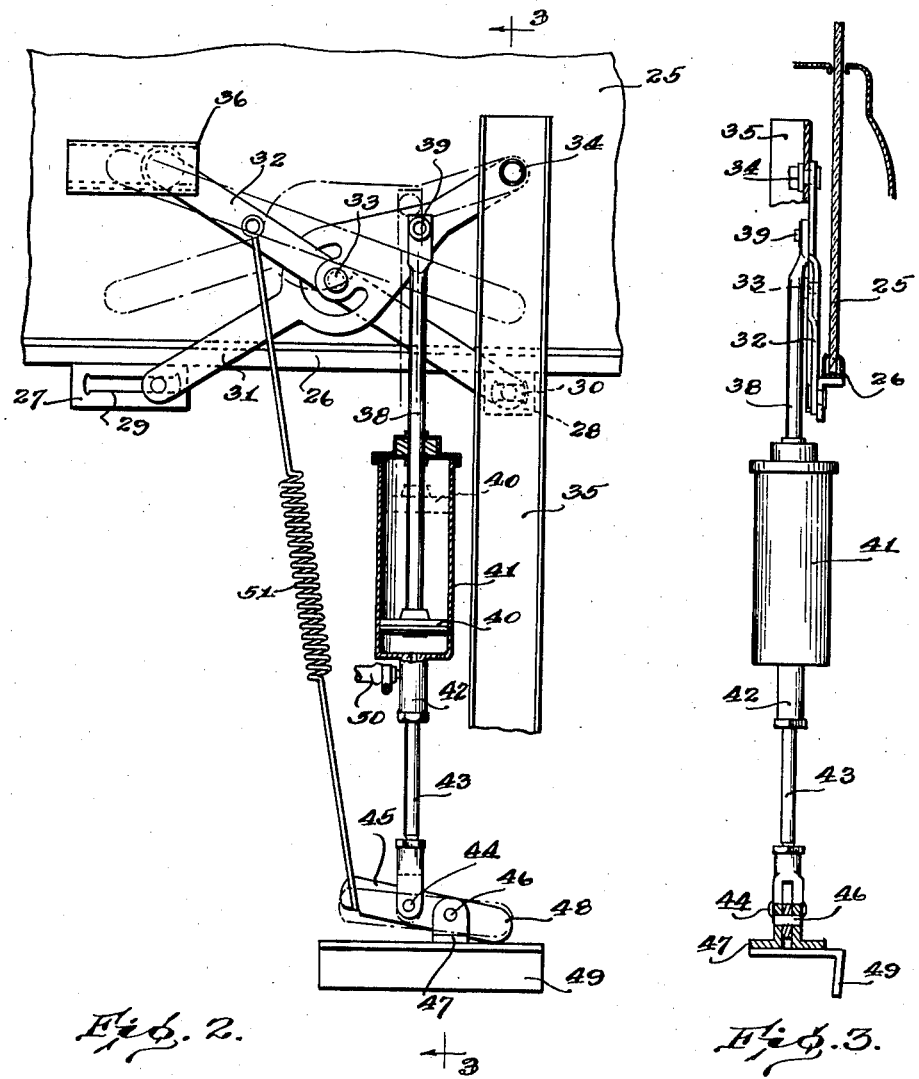

Other objects and advantages of the invention will hereinafter appear and for purposes of illustration but not of limitation, an embodiment of the invention is shown on the accompanying drawings in which Figure 1 is a fragmentary side elevation of an automobile body, parts of which have been broken away to show the actuating mechanism;

Figure 2 is a fragmentary side elevation, partly in section, of the window regulator mechanism and associated parts; and Figure 3 is a vertical sectional elevation substantially on the line 3—3 of Figure 2.

The illustrated embodiment of the invention comprises an automobile body 10 of the convertible type having a folding top 11 which, as will be readily understood, can be folded rearwardly so that the top in collapsed condition will fit into the compartment 12 rearwardly of the rear seat 13.

Adjacent the front seat 24 of the body 10 is a vertically slidable window glass 25 which has a channel 26 embracing the lower edge of the window glass 25 and depending from the channel 26 in spaced relation are retainers 27 and 28. The retainer 27 is formed with a longitudinally elongate slot 29 and the retainer 28 has a relatively short slot 30.

A cross arm regulator is provided for the window glass 25 and as shown, the regulator is provided with crossed arms 31 and 32 which are pivoted together intermediate their ends at 33. A stud on one end of the arm 31 is slidable in the slot 29 and a stud on the corresponding end of the arm 32 is slidable in the slot 30 in the retainer 28. The opposite end of the arm 31 has a fixed pivot 34 which is mounted on an upright supporting post 35. The opposite end of the arm 32 has a stud which slides in an elongate slot or channel 36 which is fixed to the inside of the vehicle door 37 in which the window glass 25 is mounted. Cross arm regulators of the above construction are well known to those skilled in this art and more detail description and illustration thereof is not considered necessary.

For moving the window glass 25 upwardly or to closed position, a piston rod 38 is pivoted at 39 to the regulator arm 31 intermediate the pivotal point 33 of the regulator arms and the pivotal mounting 34. The piston rod 38 has a piston 40 at its lower end which fits within an elongate cylinder 41. Fixed to the lower end of the cylinder 41 is a fitting 42 to which is fixed an arm 43 which is pivotally connected by a pin 44 to a mounting arm 45. The mounting arm 45 is pivoted intermediate its ends at 46 to a rigid bracket 47. The arm 45 has an extension 48 which projects beyond one side of the bracket 47 and is engageable with the bracket support 49 which provides a stop for limiting the clockwise swinging movement of the arm 45. For forcing the piston 40 upwardly within the cylinder 41, a tube 50 connects to the fitting 42 and is suitably connected to a pump 19, a valve mechanism (not shown) being employed to permit the liquid within the cylinder to be forced back into a reservoir 20 when the window is lowered. It will be understood that liquid is forced under pressure by the pump 19 through the tube 50 and the pump 19 which is operated by a suitable electric motor 19a draws liquid from a reservoir 20 through a tube 21, liquid being returned to the reservoir to the tube 22 upon proper actuation of such valve mechanism. Since the specific valve mechanism employed forms no part of the present invention and will be readily understood by those skilled in the art, further illustration and description thereof is not considered necessary. One form of valve mechanism usable in this connection is shown and described in United States Patent No. 2,279,243, dated April 7, 1942.

Pivotally connected to the regulator arm 32 intermediate the pivot 33 and the elongate guide or track 36 is a contractile spring 51 which has its lower end connected to the left-hand end portion of the mounting arm 45, this spring being normally under tension with the window in open position. It will be observed that both the cylinder arm 43 and the spring 51 are connected to the mounting arm 45 on the same side of the bracket 46 and that the bracket support 49 also provides a stop limiting the counterclockwise movement of the arm 45.

The window operating mechanism will be readily understood; by introducing fluid under pressure to the cylinder 41, the piston will be forced upwardly thereby swinging the regulator cross arms so as to cause the window glass 25 to move upwardly. In its extreme upper position, the piston 40 will assume approximately the position shown by dotted lines on Figure 2, and will be held in adjusted position by the liquid trapped within the cylinder, leaving a space between the upper end of the piston and the upper closed end of the cylinder. During the upward movement of the window glass 25, it will be manifest that the coil spring 51 will gradually be tensioned and when expanded to the upper limit of movement of the window glass, the force exerted by the spring is so chosen as approximately to counterbalance the pressure exerted against the piston 40 by the pressure fluid. Consequently in the event of expansion due to temperature conditions of the fluid within the cylinder 41 which would normally tend to force the window glass 25 upwardly and might result in breakage, the mounting arm 45 will be caused to swing downwardly or in a counterclockwise direction and as a result, the coil spring 51 serves as a buffer to absorb such additional movement. In this manner, breakage of the glass or injury to the mechanism is avoided due to the mounting of the hydraulic cylinder. The coil spring 51 not only serves to take up such fluid expansion but also assists in the downward or opening movement of the window glass 25. By manipulation of any simple valve mechanism to open the tube 50 allowing the pressure fluid to return to the reservoir 20, the spring 51 causes the window glass 25 to move downwardly; such movement being assisted by the weight of the window glass and associated parts. It will be apparent that engagement of the ends of the mounting lever 45 against the bracket support 49 affords stops for limiting the movement of the parts.

From the foregoing description, it will be understood that the window can be automatically operated in an extremely simple manner between two limits of travel i. e. open and closed positions as desired by the operator. It is to be understood that the invention is not limited to the use of the mechanism in connection with vehicle windows but is of much broader scope and can be used in any place where it is desired to move a member to and fro between two predetermined limits of travel. For example, the mechanism can be employed to advantage in connection with vehicle seat adjustment where the seat can be moved or adjusted toward and away from the steering wheel. Numerous changes in details of construction, arrangement and operation may also be effected without departing from the spirit of the invention especially as defined in the appended claims.

This application constitutes a continuation of my application Serial No. 426,438, filed January 12, 1942, and entitled "Hydraulic system for vehicle bodies."

What I claim is:

1. The combination of a vehicle window regulator having a pair of cross arms connected to effect window opening and closing movements in response to swinging action of said arms, fluid pressure means including piston and cylinder parts connected to one of said arms for actuating same, a pivoted mounting arm to which one of said parts is connected, and a coil spring connecting the other of said cross arms to said mounting arm and on the same side of the pivot thereof as said part, whereby the spring assists in moving the vehicle window in one direction and compensates for expansion of pressure fluid when the vehicle window is in closed position.

2. The combination of a vehicle window regulator having a pair of cross arms connected to effect window opening and closing movements in response to swinging action of said arms, fluid pressure means including piston and cylinder parts connected to one of said arms for actuating same, a pivoted mounting arm to which one of said parts is connected and a coil spring connecting the other of said cross arms to said mounting arm and on the same side of the pivot thereof as said part, said spring being so chosen that it substantially counterbalances the force exerted by said fluid pressure means when the spring is under maximum tension, whereby the spring assists in moving the vehicle window in one direction and compensates for expansion of pressure fluid when the vehicle window is in closed position.

3. The combination of a vehicle window regulator having a pair of cross arms connected to effect window opening and closing movements in response to swinging action of said arms, fluid pressure means including piston and cylinder parts having one of its parts connected to one of said arms for actuating same, a spring, a mounting for one end of said spring enabling same to be placed under tension upon movement of the vehicle window in one direction thereby to assist in movement of the window in the opposite direction, and means interconnecting the other of said piston and cylinder parts to the opposite end of said spring thereby enabling said spring to absorb the expansion of pressure fluid when the vehicle window is in closed position.

4. The combination of a swinging arm vehicle window regulator, pressure fluid means for actuating said regulator, spring means, a mounting for one portion of said spring means enabling same to be tensioned upon movement of said regulator in one direction by operation of said pressure fluid means thereby to assist the movement thereof in the opposite direction, and movable means connected to another portion of said spring means and also connected to said pressure fluid means for enabling said spring means automatically to serve as a buffer for absorbing the expansion of pressure fluid when the window has been moved to closed position.

5. The combination of a vehicle window regulator, pressure fluid means cooperating with said regulator for effecting window opening and closing movements, a coiled spring, a mounting for one end of said spring enabling same to be tensioned upon regulator movement in one direction by operation of said pressure fluid means thereby to assist in window movement in the opposite direction, and movable means interconnecting said pressure fluid means and the opposite end of said spring to enable the latter to absorb the expansion of pressure fluid when the window is in closed position.

6. The combination of a vehicle window regulator, pressure fluid means cooperating with said regulator for effecting window opening and closing movements, a coiled spring connected at one end to said regulator to be tensioned upon regulator movement in one direction by operation of said pressure fluid means thereby to assist in window movement in the opposite direction, and means interconnecting said pressure fluid movable means and the opposite end of said spring to enable the latter to absorb the expansion of pressure fluid when the window is in closed position, said spring being so chosen as to approximately counterbalance the force of said pressure fluid means when the spring is under its maximum tension imposed thereon in response to regulator movement.

7. The combination of a vehicle window regulator, pressure fluid means cooperating with said regulator for effecting window opening and closing movements, a coiled spring, a mounting for one end of said spring enabling same to be tensioned upon regulator movement in one direction for assisting in window movement in the opposite direction, and means interconnecting said pressure fluid means and the opposite end of said spring to enable the latter to absorb the expansion of pressure fluid when the window is in closed position, said last means providing a stop for limiting the window opening movement of the parts.

8. The combination of a vehicle window regulator having a pair of cross arms connected to effect window opening and closing movements in response to swinging action of said arms, fluid pressure means including piston and cylinder parts connected to one of said arms for actuating same, a pivoted mounting arm to which one of said parts is connected, and a coil spring connecting the other of said cross arms to said mounting arm and on the same side of the pivot thereof as said part, a bracket for said arm providing a fulcrum intermediate the ends thereof, and means providing an abutment for limiting the swinging movement of the mounting arm in both directions.

9. The combination of a member movable in opposite directions between two limits of travel, pressure fluid means for effecting movement of said member in one direction, said pressure fluid means including cylinder and piston parts, one of which parts is operatively connected to said member, a coiled spring, a mounting for one end of said spring enabling same to be tensioned upon movement of said member in one direction by operation of said pressure fluid means thereby to assist in movement of the member in the opposite direction, and movable means interconnecting the other of said cylinder and piston parts and the opposite end of said spring to enable the latter to absorb the expansion of pressure fluid when the member is in the extreme position to which it is moved by said pressure fluid means.

10. The combination of a member movable in opposite directions between two limits of travel, pressure fluid means for effecting movement of said member in one direction, said pressure fluid means including cylinder and piston parts, one of which parts is operatively connected to said member, a coiled spring, a mounting for one end of said spring enabling same to be tensioned upon movement of said member in one direction for assisting in movement of the member in the opposite direction, a pivoted mounting arm to which the other of said cylinder and piston parts is connected, the other end of said spring being anchored to said arm and on the same side of the pivot thereof as said part, a bracket providing a fulcrum for said arm, and means providing an abutment for limiting the swinging movement of said mounting arm.

JOHN B. PARSONS.